United States Patent [19]

Teissier et al.

[11] Patent Number: 4,966,080
[45] Date of Patent: Oct. 30, 1990

[54] FREE TRANSFER MACHINE WITH INDEPENDENT MOTORIZED CARRIAGES

[76] Inventors: Etienne M. Teissier, Route de Montvendre, 26120 Malissard; Bruno A. E. Marie, Camping Alain Merle, Route de Valence, 26120 Chabeuil, both of France

[21] Appl. No.: 161,090

[22] Filed: Feb. 26, 1988

[30] Foreign Application Priority Data

Mar. 4, 1987 [FR] France ................. 87 03129

[51] Int. Cl.$^5$ .............................................. B60L 11/00
[52] U.S. Cl. ...................................... 104/289; 104/254; 105/29.1
[58] Field of Search ................. 104/48, 288, 289, 295, 104/249, 250, 252, 254, 139, 247; 105/50, 29.1; 293/2, 4; 180/275, 279

[56] References Cited

U.S. PATENT DOCUMENTS

| | | |
|---|---|---|
| 2,555,854 | 5/1951 | Lee . |
| 3,404,762 | 10/1968 | Leblanc ................. 188/161 X |
| 3,696,756 | 3/1972 | Elmore et al. . |
| 3,718,097 | 2/1973 | Tourneau et al. ............... 104/295 X |
| 3,796,327 | 10/1974 | Meyer et al. . |
| 3,845,718 | 2/1974 | Rogers et al. . |
| 4,137,984 | 2/1979 | Jennings et al. .................. 180/98 |
| 4,207,821 | 6/1980 | Beckert .............. 105/29.1 X |
| 4,416,202 | 11/1983 | Rooklyn ............. 104/247 X |
| 4,570,543 | 2/1986 | Ishikura et al. ............. 105/50 X |
| 4,597,709 | 1/1986 | Yonezawa . |

FOREIGN PATENT DOCUMENTS

| | | |
|---|---|---|
| 3318469 | 3/1984 | Fed. Rep. of Germany . |
| 0056403 | 4/1980 | Japan .................... 104/289 |
| 58-113020 | 6/1983 | Japan . |
| 59-110522 | 10/1984 | Japan . |
| 631939 | 9/1982 | Switzerland . |

OTHER PUBLICATIONS

Mowbray, Melton; "Production Automation-Mechanized and Automated Handling in a Shop Producing Axially-Symmetrical Parts"; Feb. 1978; Machines & Toolins, vol. 49, No. 2, pp. 4-7.
Grote, J. R.; "A Cog-Wheel Driven Robot Cart"; Robotics Age, vol. 5, No. 5, Sep.-Oct. 1983, pp. 20-29.
Bertino, M.; "Leitliniengefuhrtes Flurforderzeugsystem"; Werkstatttechnik, Zeistchrift fur Industrielle Fertigung, vo. 76, No. 9, Sep. 1986, pp. 528-532.

Primary Examiner—Johnny D. Cherry
Assistant Examiner—Joseph D. Pape
Attorney, Agent, or Firm—Bacon & Thomas

[57] ABSTRACT

The present invention relates to a free transfer machine equipped with independent motorized carriages. Each carriage comprises a variable speed motor, a rechargeable battery connected to contact blocks, and an individual travelling control system comprising a motor supply and control circuit which is controlled by a switch actuated by a front bumper and by a contactor mounted in series with the switch and carried by the lower face of the carriage in such a way as to be actuated by the rectractable stop members. The circuit is also under the control of environmental sensors. The carriages travel on trackways which include work stations, reed-contacts connected to an electric charge device and designed to operate with the contact blocks. The transfer machines are suitable for production and assembly lines.

5 Claims, 13 Drawing Sheets

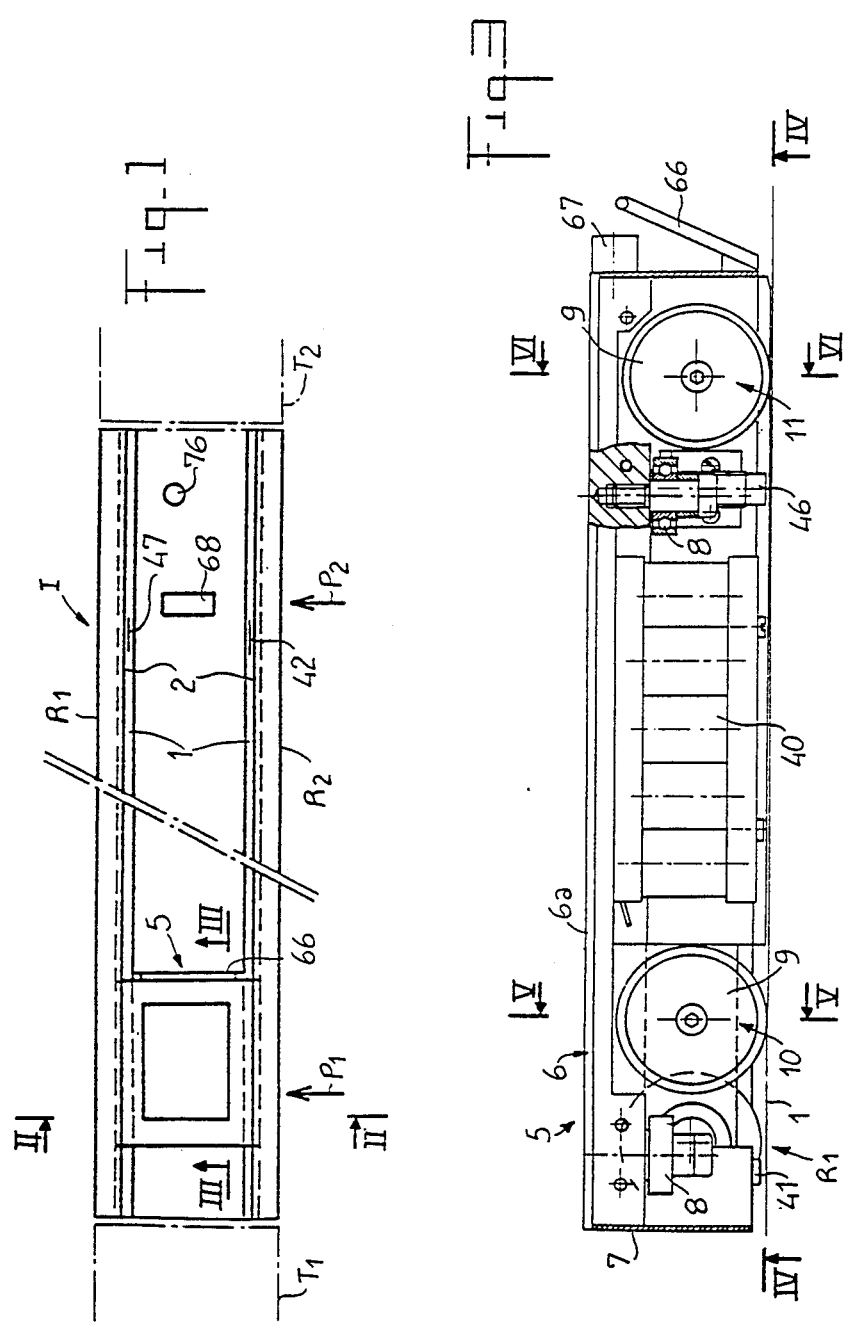

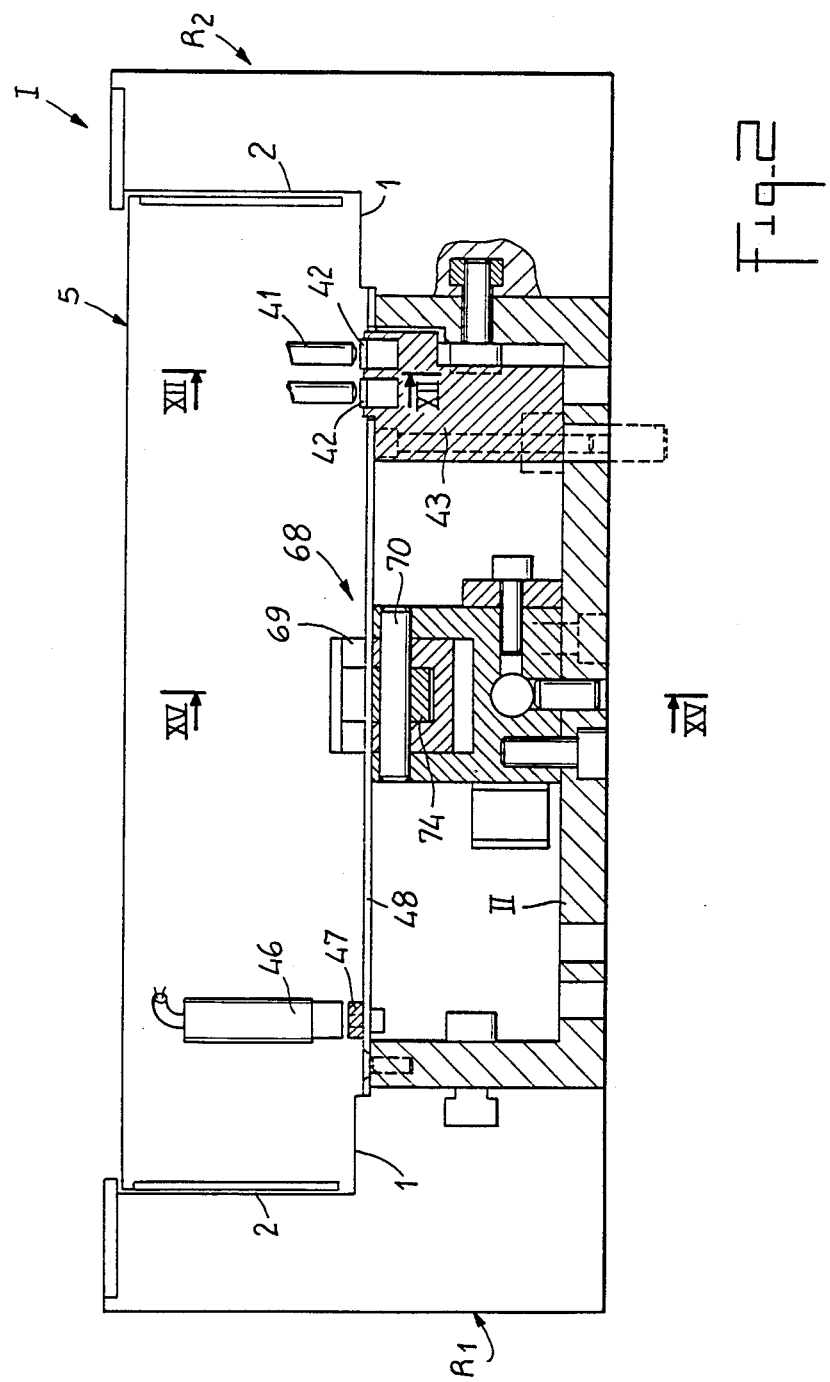

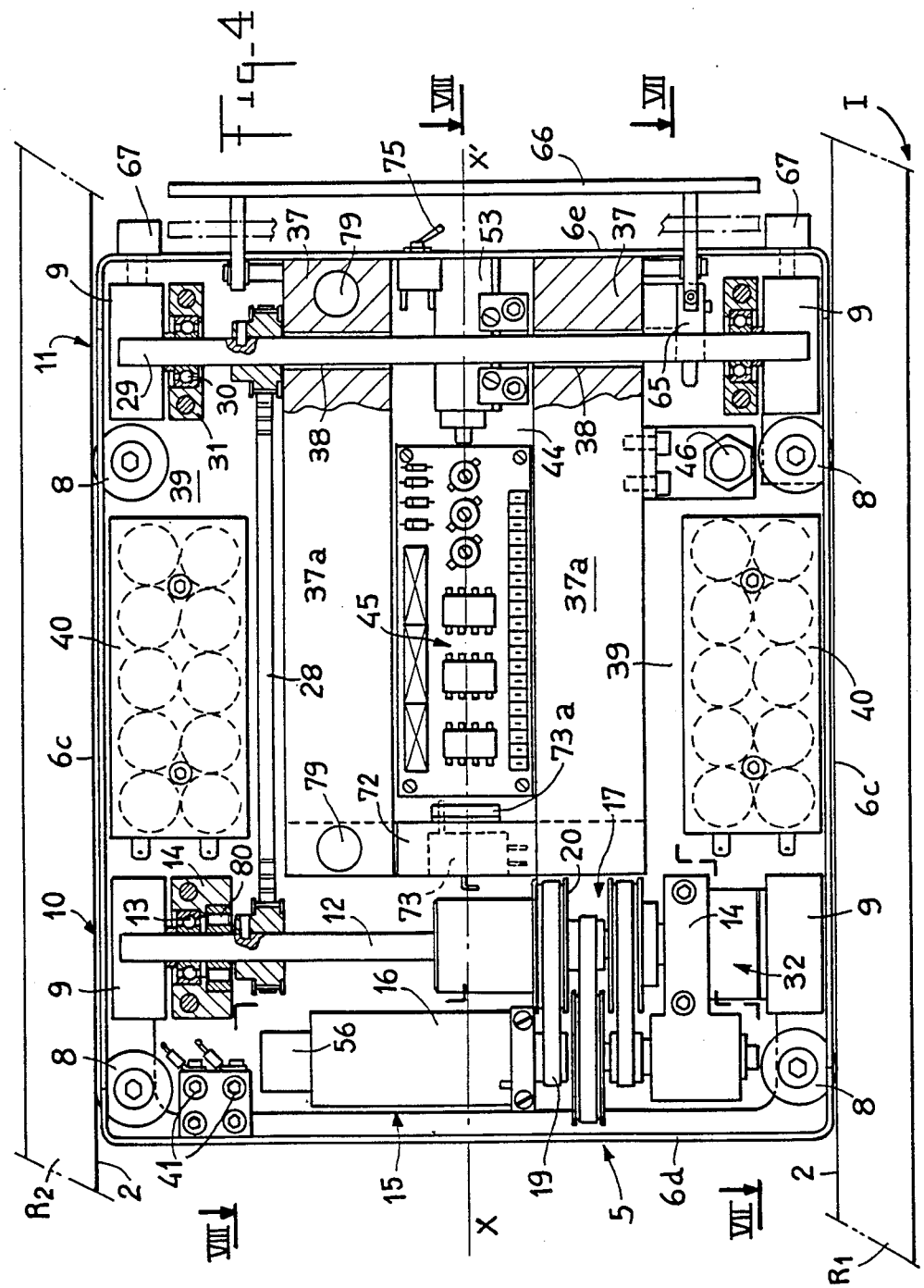

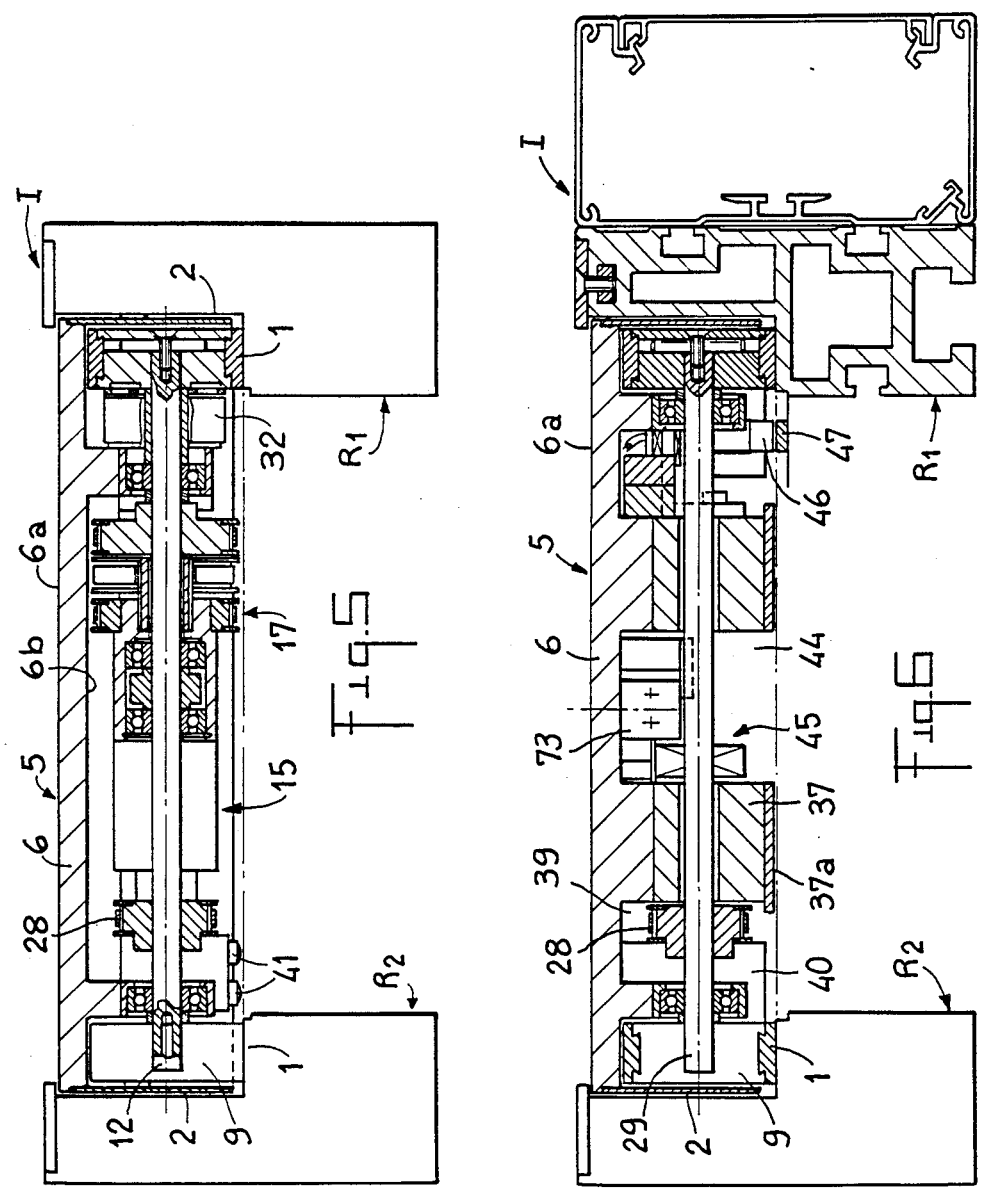

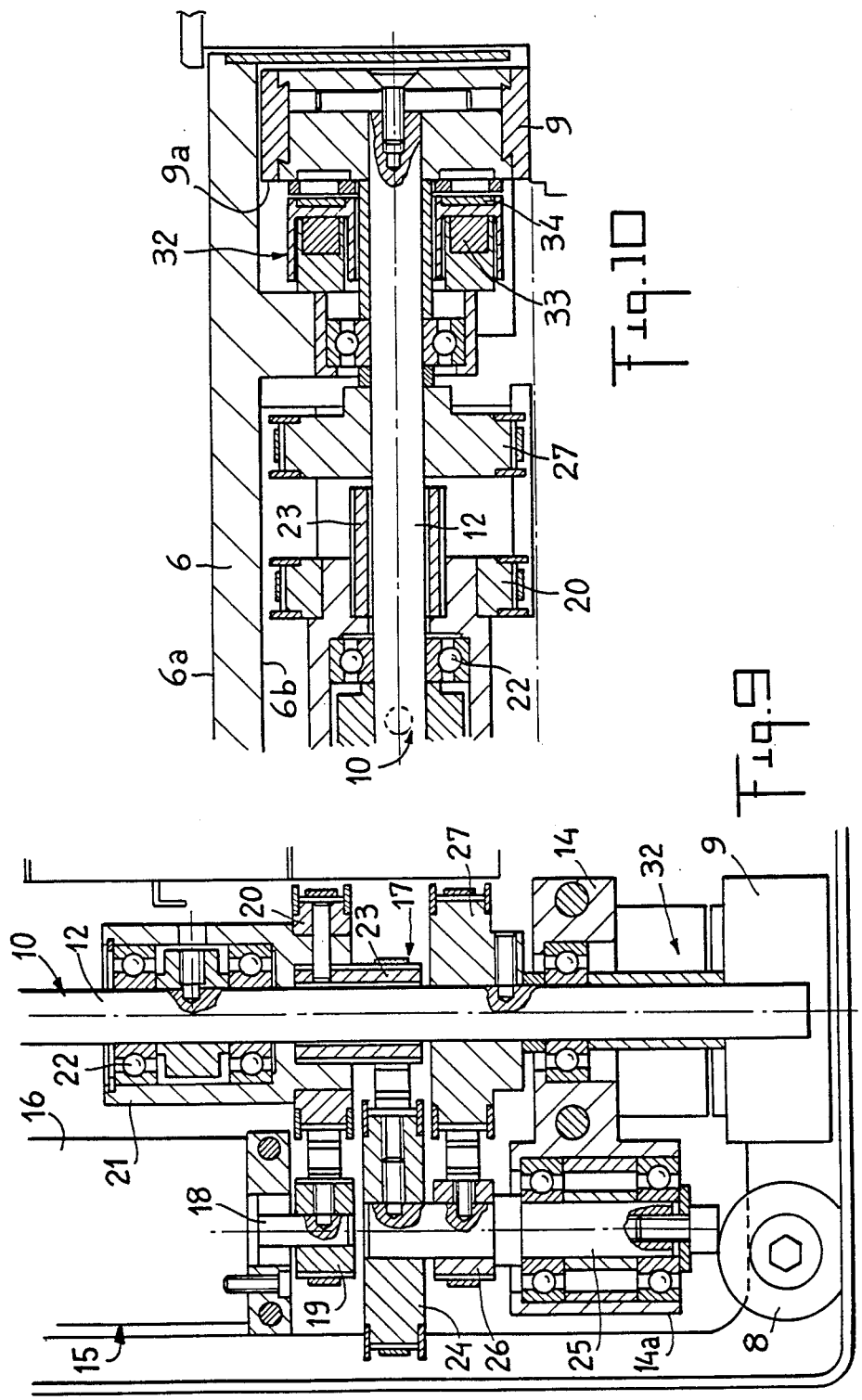

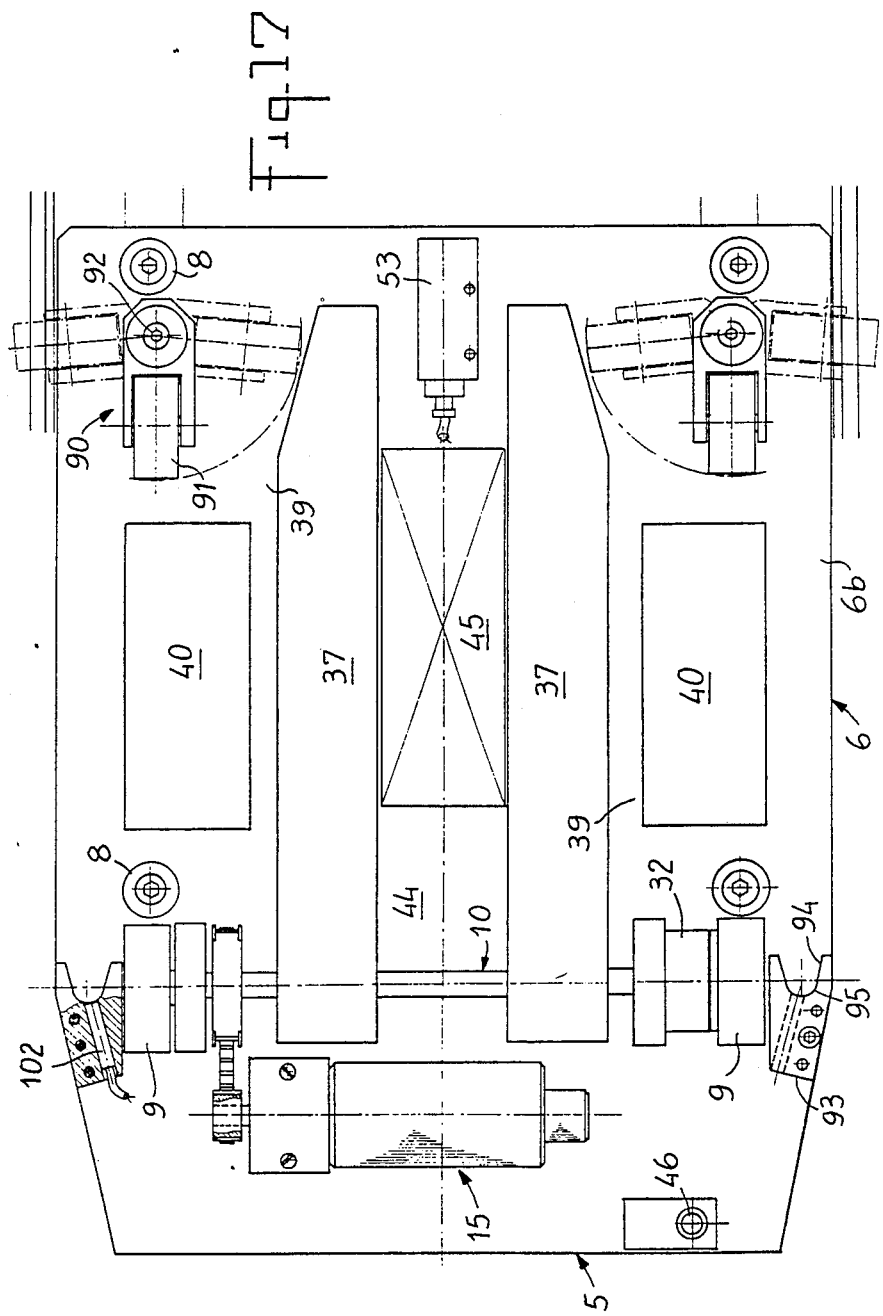

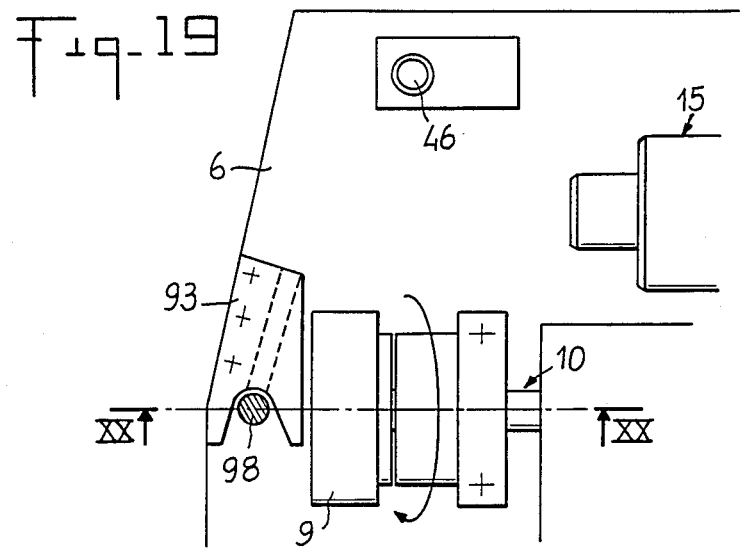
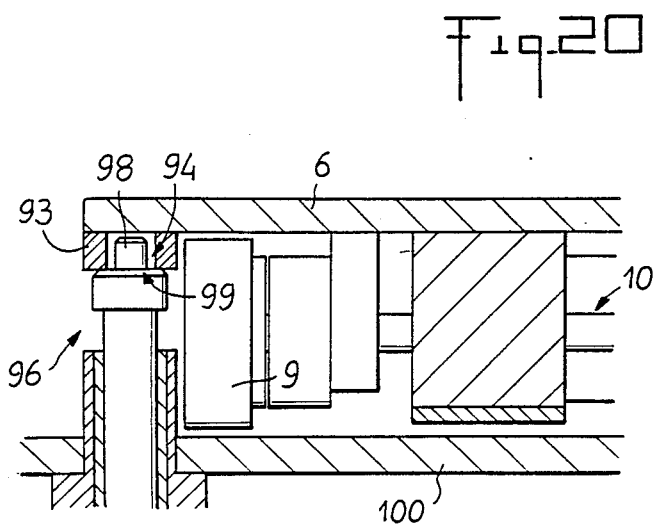

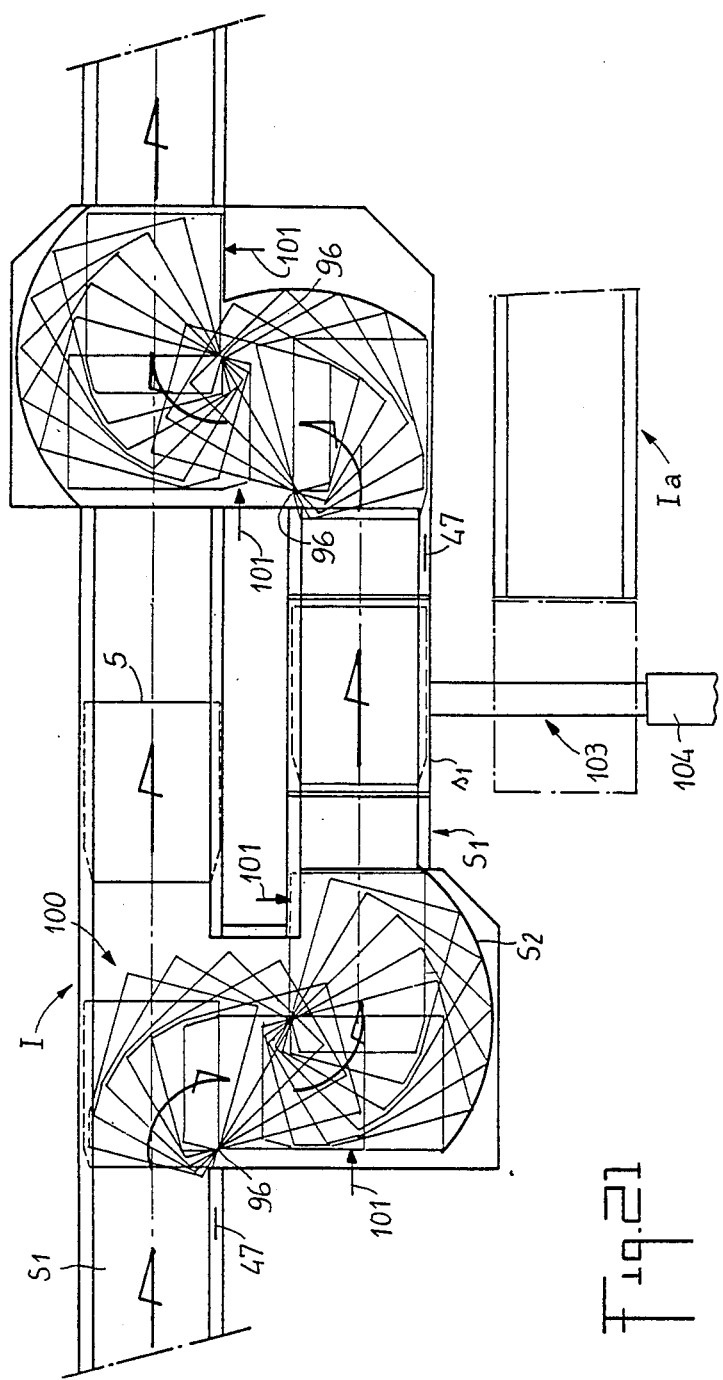

FREE TRANSFER MACHINE WITH INDEPENDENT MOTORIZED CARRIAGES

FIELD OF THE INVENTION

The present invention relates to the transport of various types of loads or workpieces between work or intervention stations which may be operating stations, control stations, assembling stations, assembling stations, testing stations, etc.

BACKGROUND OF THE INVENTION

The need to resort to an automatic transfer between a succession of work stations, has been felt for a long time now, in order to rationalize a manufacturing, assembling, mounting or treating process and to reduce, if not eliminate completely, all human intervention at each operational step in such a process.

To reach this object, the prior art has proposed a number of solutions which can be classified in two families corresponding, respectively, to transfer machines with bound carriages and to transfer machines with free carriages.

In the first family, the machines define a trackway, set up in relation with the different work stations. Such a trackway is used for moving and guiding carriages which are interconnected in the manner of an endless chain or conveyor, driven by any suitable drive member.

Such a solution may present certain advantages in special applications in which the mass of workpieces or of loads to be transferred is quite small. In other cases, such a solution present starting and stopping problems, on account of the inertia represented by all the transfer carriages organized in the form of an endless unitary chain.

One related problem resides in the difficulty of using suitable indexing means which are, nonetheless, necessary in front of each work station, so that the elementary operations so that any elementary operation relative to every stopping phase, in relation to the supported workpieces or loads, can be performed with as much accuracy as possible.

Conceivably, this requirement is not very compatible with the organization of a large number of transfer carriages into an endless chain, in which the successive interconnections of the carriages, which are necessarily articulated, introduce a tolerance factor which is difficult to control.

The transfers, known as bound transfers, are not either a particularly adaptable technical solution since there is no possibility with such a structure, of organizing by-pass tracks or stand-by sectors, and also since the moving cycle must, necessarily, conform with the longest individual operation time of all the work stations.

Such transfers therefore have a limited output and offer but little adaptability when an intervention is necessary in the course of the general process, or when it becomes imperative to use such transfers for carrying out operations for which it was not initially designed.

The transfer machines of the second family have been designed to overcome the aforesaid necessities. Such machines comprise a trackway defining guiding and supporting rails for free and independent carriages which are moved from one work station to the other, via drive members incorporated to the trackway.

It is unquestionable that such an organization has represented a positive evolution with respect to the transfer machines of the other family. Yet, a number of disadvantages are also found with these transfer machines with free carriages.

The carriages, which are placed on the trackway, are entirely controlled by that trackway and are dependent on the driving means incorporated in said trackway. This implies that the speed of such carriages is limited because there is no damping of the acceleration and deceleration phenomena which, however, should be limited in order to reduce shocks, particularly when the transfer machine has stopped, either in front of a work station, or because the carriages are in direct abutting contact.

The means of starting off the different carriages must, necessarily, be provided throughout the length of the trackway, this requiring a large number of drive members, which increases the risks of loss of synchronization, of wear, of failure, of noise, of bulkiness and of safety.

Although such machines can be produced in modular form, they nevertheless offer little adaptability, because of the necessity of always using the same constituting elements comprising a source of power, transmission members, as well as guiding members which, in general, cannot really be arranged in any other way but the linear way. The plan configurations which can be given to the trackway are, as a result, limited or else they require the use of direction changing systems which are even more complex and which, in general, have been found to be at the origin of delicate adjustments and of breakdowns, often difficult to control.

Because the elementary modules imply making use of all the constituting members, any modification will involve a lengthy stoppage time as well as delicate and costly operations, particularly when a part of the trackway between two work stations have to be modified.

And because the drive member and the transmission elements are necessarily incorporated, the overall thickness of every modular element is great and may, in some cases, raise problems of implantation for hand-operated work stations, for which a steady efficiency is always the target.

Though the existence of free and independent transfer carriages makes it possible, when defining a general work cycle, to do away with the longest operation time of one of the work stations, the maximum moving speed, between stations, is, on the contrary, limited to the capacity of the transmission members provided in the trackway. In order to counterbalance said limited speed, it is generally admitted to have a large number of free carriages travelling on the trackway. In addition to the resultingly increased overall dimensions of the trackway, the excess number of carriages unavoidably causes a localized accumulation, for example against one carriage being stopped in working service in front of a work station. In such a case, the number of carriages blocked horizontally on the trackway, increases very considerably the friction with the transmission members and strains noticeably the motor which drives them continuously. In addition, such accumulation occurs against the carriage which is stopped against the retractable stop member of a work station. Said stop member then undergoes a great thrust, resulting from an accumulation of the elementary frictions between the transmission members and the stacked carriages. Such thrust is often the cause of a deterioration of the structure or of the stopping position of the retractable stop member.

On the whole, therefore, the transfer machines equipped with free carriages, although they bring advantages over the machines of the other family, are not yet fully satisfactory, and are currently found to raise certain unsolvable problems of incorporation in fully automatic production lines using robotized work stations which, by their very structure, experience appreciably different operating times within the same production line.

In order to reduce the number of the aforementioned disadvantages, the prior art has concentrated on developing the transfer machines of the second family. One particular French patent application FR-A-2 585 008 (85-11048) can be cited to this effect. This application describes an automatic transfer machine equipped with transfer means constituted by rails and autonomous carriages or pallets, provided with their own driving means. The autonomy-inducing means consist in an electric motor which is carried by the pallet and supplied by shoes operationally coupled with collectors carried by the rails.

Such a machine is also equipped with a centralized system for controlling the progress of the pallets by using a central unit, programmed by local passage sensors, to remote-control the supply or non-supply of electric power to the collectors.

Although this particular construction is an improvement over the previous solutions, it remains nonetheless unsatisfactory for the following reasons.

The real object is to make the machine adaptable in operation, so that it will allow the performance of industrial processes liable to certain variations, the aim there being to enable the use of the transfer machine for carrying out different operations which do not all take place automatically in succession. It would then be possible with such a machine to carry out different production programmes, for the same article or for different articles, and thus to be able to meet the demand.

In order to reach this object, it is important to find a solution to two kinds of problems.

The first one is that of a reliable self-supply of driving power, and the solution proposed by Application FR-A-2 585 008 does not fulfill the object. It is indeed a known fact that when shoes are moved on collectors, especially with a low voltage current, this causes a "charring" effect which instantly changes the conditions of transmission of the electric power. As a result, no reliable-in-time displacement of a pallet equipped as aforementioned can be guaranteed.

The second problem is that of the control of the displacement of all the pallets or carriages transporting loads from one work station to another, where operations of different durations are conducted. Application FR-A-2 585 008 has not, by centralizing the control of the overall displacement, procured a smooth running, as in fact this is frozen by the programme of the central unit which merely takes into account the preprogrammed passage detections to authorize the performance of an operating sequence.

There is therefore an obvious need for a transfer machine, of the type with free carriages, which will have none of the aforementioned disadvantages, but which, on the contrary, will show an ability to adapt automatically the time of transfer between two work stations, whatever the distance separating these stations and the operating time required by each one.

SUMMARY OF THE INVENTION

It is precisely the object of the present invention to solve the above-expressed problems by proposing a new free transfer machine with motor-driven independent carriages.

The object of the invention is therefore to propose a new transfer machine composed of a support and guiding structure of particularly simple design, with free and self-motorized carriages, capable of storing a reserve of power, which is partly reconstituted if the need arises, during a stop at a work station. The chains according to the invention have the added capacity to adapt automatically their moving speed as a function of the distance to be covered and of the conditions for stopping at a work station, so as to reduce to a minimum the actual transfer time, independently of the configuration of the trackway and of the operating times required at each station, by using individual travelling control means.

A further object of the invention is to propose means for organizing a trackway which can comprise rapidly and efficiently implanted changes of direction, without the need for a particularly complex structure. This offers the possibility, never reached until now by the prior art, of permitting instant and ready modification of the implantation and configuration of a trackway as a function of an overall operation process to be performed.

Another object of the invention is to propose a new transfer machine having a trackway of the endless type, the configuration of which can be readily adapted as a function of multiple operations requirements.

Another object of the invention is to propose a new free transfer machine which can have a loading and running structure of small thickness, which will meet all the requirement of ergonomics, which is without any drive members moved in permanent and continuous manner and therefore which offers maximum security for the operating personnel.

Yet another object of the invention is to propose new means for producing a transfer machine of which the trackway can be set up instantly, practically and reliably, between work stations which may be situated at different levels.

The aforesaid objects are reached according to the invention with a free transfer machine of the type comprising a trackway set up in relation to work stations which are each provided with a retractable stop member and with independent travelling carriages which are carried, guided and driven along the trackway and which are designed to transfer the load that they support, from one work station to another, each carriage being equipped with a set of driving wheels actuated by an on-board electric drive member energized from an equally on-board battery, said free transfer machine being characterized in that:

each carriage comprises:
a variable speed motor,
a rechargeable battery connected to contact blocks,
and an individual travelling control system comprising a motor supply and control circuit which is controlled by a switch actuated by a front bumper and by a contactor mounted in series with said switch and carried by the lower face of the carriage in such a way as to be actuated by the retractable stop members, said circuit being also placed under the control of environment sensors, the trackway comprises, in relation with each work station, reed-contacts connected to an electric charge device and designed to cooperate with the contact blocks.

BRIEF DESCRIPTION OF THE DRAWINGS

The invention will be more readily understood on reading the following description with reference to the accompanying drawings, in which:

FIG. 1 is a diagrammatical plan view of a transfer machine.

FIG. 2 is a cross-section, on an enlarged scale, along line II—II of FIG. 1.

FIG. 3 is an elevational section, partly broken out, taken along line III—III of FIG. 1.

FIG. 4 is a partly sectional view from below, taken along line IV—IV of FIG. 3.

FIGS. 5 and 6 are cross-sections taken, respectively, along lines V—V and VI—VI of FIG. 3.

FIGS. 9 to 11 are partial sections showing, on an enlarged scale, certain embodiment details.

FIG. 17 is a bottom view, similar to FIG. 4, illustrating another embodiment of the object of the invention.

FIG. 19 is a bottom view showing the cooperation between the elements according to FIGS. 17 and 18.

FIG. 20 is an elevational section taken along line XX—XX of FIG. 19.

FIG. 21 is a plan view illustrating one possibility of implantation of the machine offered by the means shown in FIGS. 17 and 18.

DESCRIPTION OF THE PREFERRED EMBODIMENTS

Figure 7:
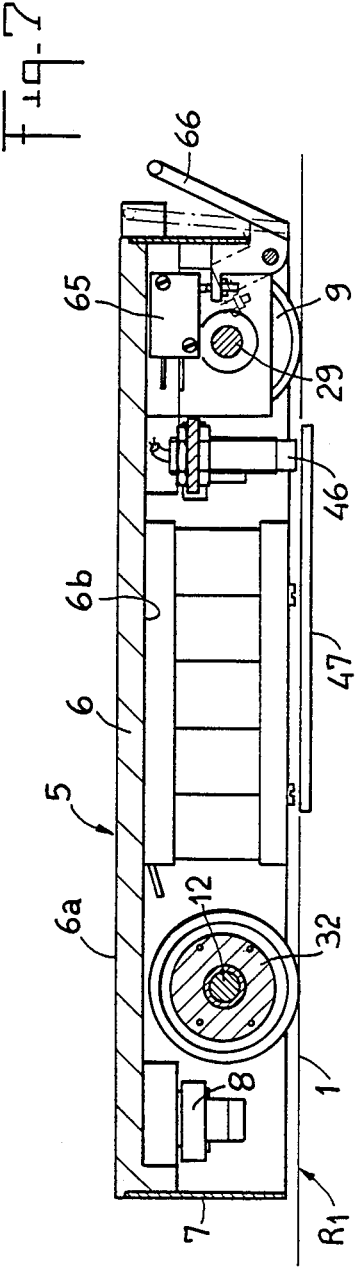
FIGS. 7 and 8 are cross-sections taken, respectively, along lines VII—VII and VIII—VIII of FIG. 4.

Referring now to the drawings, FIG. 1 diagrammatically illustrates a transfer machine according to the invention, composed of a trackway I permitting the transport of workpieces or loads of various types between work stations, of which two only $P_1$ and $P_2$ are diagrammatically shown.

The trackway I extends between a table $T_1$ for loading the workpieces to be transported and a table $T_2$ for unloading said workpieces. Said trackway I is essentially constituted (FIG. 2) by two parallel rails $R_1$ and $R_2$ mounted on a carrying structure II. Rails $R_1$ and $R_2$, constituted for example by tubular sections, provide by way of their internal faces, running surfaces 1 and lateral guiding surfaces 2 of horizontal and vertical cross-sections respectively.

Surfaces 1 and 2 are provided for supporting and guiding a motor-driven carriage 5 which comprises, as illustrated in FIGS. 3 to 8, a plate 6 normally equipped on its upper face 6a, with means for removably positioning and centering workpieces or loads. Said means, which are the conventional ones used with transfer machines, have not been shown in the drawings because they are essentially dependent on the selected application, and they are known of anyone skilled in the art.

The plate 6, which is preferably bordered on its periphery by a skirt or fairing 7, is provided on its lower face 6b with runners 8 projecting slightly with respect to longitudinal faces 6c for cooperating with the guiding surfaces 2. The face 6b also supports rolling members 9 designed to cooperate with the surfaces 1. Said rolling members 9 are preferably constituted by wheels with separate adhering tires and are so arranged as to form a rear train 10 and a front train 11. The rear train 10 is composed of two extreme wheels 9 mounted on a shaft 12 fitted via rollers 13 in bearings 14 of the plate 6. Shaft 12 is powered by a motor unit 15 and preferably by a geared motor unit. Unit 15 comprises a variable speed motor 16 mounted on the lower face 6b so as to extend in parallel to shaft 12. Unit 15 further comprises a reduction gear 17 placed between the output shaft 18 of the motor 16 and the shaft 12. Reduction gear 17 is for example of the three-step type, using preferably for each step, a synchronous belt drive. The synchronous belt drive method is preferably selected to allow the transmission of a high torque, at high speed and with little noise.

FIG. 9 clearly shows that the reduction gear 17 is so designed that its first reduction step is constituted by an output gear 19 mounted on the shaft 18 and by a driven gear 20 mounted on a countershaft 21. According to a preferred embodiment, the countershaft 21 is of tubular type and is carried via rollers 22, concentrically to and on driving shaft 12. Countershaft 21 carries a driving gear 23 for the second reduction step which is constituted by said gear 23 and by a gear 24 mounted on a countershaft 25 parallel to shaft 12 and co-axial, for example, to output shaft 18. Countershaft 25 is carried by a double bearing 14a defined by the corresponding bearing 14. Countershaft 25 carries a gear 26 which constitutes the third reduction step and cooperates with an additional gear 27, wedged angularly and axially on driving shaft 12 for driving said shaft in self-motivated rotation.

In the illustrated embodiment, the driving shaft 12 of the train 10 is connected, via preferably a belt transmission 28, to the train 11 which is composed of two wheels 9 mounted on a shaft 29, which shaft is mounted, via rollers 30, in bearings 31 of the plate 6, so as to extend in parallel to shaft 12.

Figure 11:
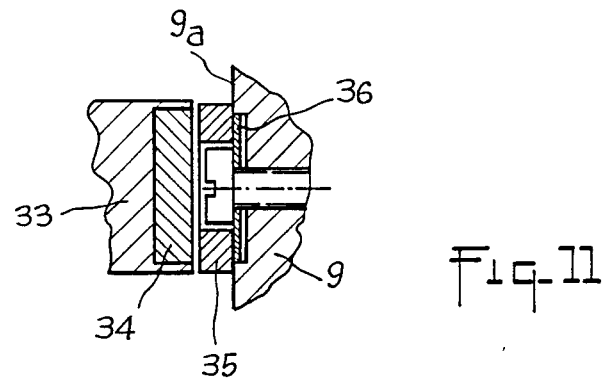

The motor-driven rear train 10 is, preferably, associated to an electro-mechanical braking member 32, as more particularly illustrated in FIGS. 10 and 11. Braking member 32 comprises an annular magnetic coil 33 mounted on the bearing 14 so as to be situated concentrically to shaft 12 close to a wheel 9. Annular coil 33 is provided, on its face opposite the annular face 9a of the wheel 9, with an annular friction disk 34, preferably removably mounted on the coil 33. Said friction disk 34 is oriented in facing relationship to face 9a supporting an annular disk 35 in magnetic material, mounted via elastically deformable strips 36 in such a way as to be angularly fixed with possibility of lateral shifting with respect to face 9a. The electro-magnetic coil is mounted in such a way as to leave a small gap between the friction disk 34 and the disk 35 in its stable resting position against face 9a.

The lower face 6b of the plate 6 is provided with two stiffening members 37, starting from its front face 6e, and which are formed by or built on said plate, said members being equipped with sole plates 37a. Stiffening members 37 extend in parallel one to the other and on either side of a longitudinal median plane of symmetry x-x', from the front face 6e to close to shaft 12. Consequently, said stiffening members 37 are traversed by the shaft 29 of the front train 11 for which they define coaxial passageways 38.

Stiffening members 37 define, from the lower face 6b, two lateral compartments 39 which are occupied, between trains 10 and 11, by two rechargeable accumulator batteries 40 constituting an on-board source of electrical power supplying the motor. Batteries 40 are electrically connected to at least two contact blocks 41 provided on the lower face 6b and extending toward the plane traversing the running surfaces 1.

Figure 12:
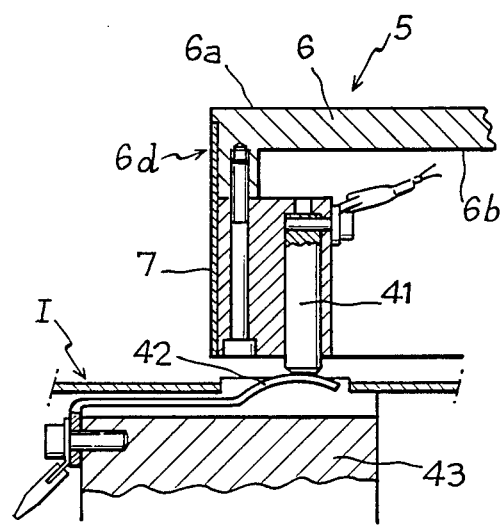
FIG. 12 is a partial cross-section taken along line XII—XII of FIG. 2.

Said contact blocks 41 are preferably provided on the plate close to the rear face 6d and on the side opposite reduction gear 17. Said blocks 41 are designed, as illustrated in FIGS. 2 and 12, to cooperate with reed contacts 42 carried by an insulating block 43 mounted close to the rail $R_2$. The reed contacts 42 are connected to an electrical charge transformer in order to recharge the batteries 40 every time the carriage 5 is stopped in front of a station P. In this case, the reed contacts 42 form part of the equipment of a station P.

The stiffening members 37 define together a central compartment 44 which is preferably reserved for the mounting and protection of an electronic servo-control circuit 45, controlling from the source of power 40, the high speed or slow speed supply of motor 16, as well as the de-energizing of the electro-mechanical brake 32. To this effect, the servo-control circuit 45 comprises, first of all, an inductive sensor 46 carried by the plate 6 so as to face the general plane of the running surfaces 1. Said inductive sensor is designed to detect the presence of bars 47 carried either by the running surfaces, or preferably, by a closing plate 48 carried by the structure II (FIG. 2). Each bar 47 represents an item of information which pre-materializes the existence or position on or close to the trackway I of a singularity because of which the carriage 5 has to adopt a slow travelling speed. In the illustrated example, the trackway 1 of the transfer machine comprises a bar 47 situated upstream of each station P.

The circuit 45 also comprises a telemetric presence finder 53, connected in parallel with the sensor 46 and placed in the central compartment 44 so as to be level with the front face 6e. Said telemetric finder 53 may be of any suitable type for detecting the existence or presence of an obstacle, such as a carriage 5 occupying the trackway I in downstream direction.

The servo-control circuit 45 further comprises a sensor 56 for measuring the travelling speed of the carriage along the trackway I. Such a sensor can be constituted by a tacho-generator or by an encoder coupled to the electric motor 16.

The working principle of the servo-control circuit 45 consists in controlling the high speed supply of the motor 16, when no information is supplied either by sensor 46 or by telemetric finder 53. On the contrary, as soon as the sensor 46 or the finder 53 sends a presence signal, the servo-control circuit 45 is required to control the power to the motor in such a way as to impose a slowing down from the maximum speed $V_{max}$ to the minimum speed $V_{min}$ of said motor.

Figure 13:
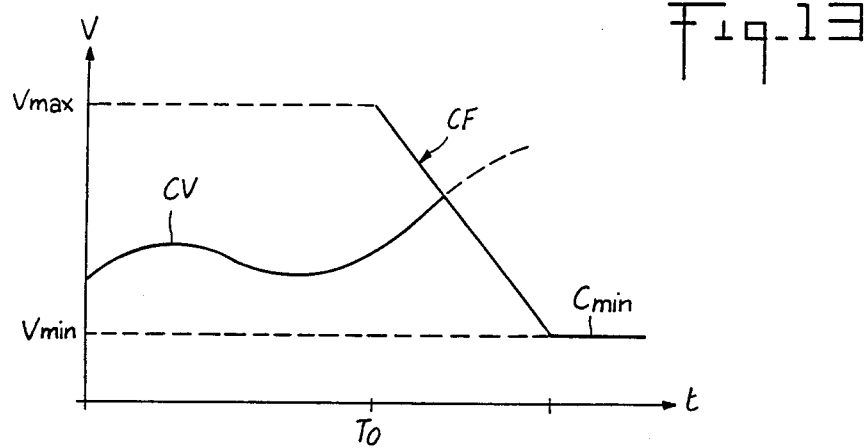
FIG. 13 is a diagram illustrating a servo-control system for controlling the travelling speed of the carriages of the transfer machine according to the invention.

FIG. 13 shows a working diagram corresponding to the servo-control circuit 45. Circuit 45 is designed in such a way as to generate, upon the supply, at a time $T_O$, by the sensor 46 or by the finder 53, of a presence signal, a signal CF representing an acceptable braking curve to bring the speed of the loaded carriage, from the value $V_{max}$ to the value $V_{min}$. Signal CF is preferably a linear curve.

Circuit 45 is designed to take into account a video signal CV of the variation of the speed curve of carriage 5. Said signal CV is an analog signal supplied by the tacho-generator.

Circuit 45 is designed to compare the signal CV with the signal CF and, if the value of signal CV exceeds signal CF, to stop the supply to the motor 16 and the energizing of the brake 32. The action of circuit 45 is therefore dependent on the speed curve of carriage 5, in order to brake the speed of the latter just at the right time and to allow the highest possible travelling speed for the longest possible time.

Circuit 45 is also designed to restore the low speed supply to the motor 16 once the predetermined minimum speed of the carriage is reached by braking.

Figure 14:
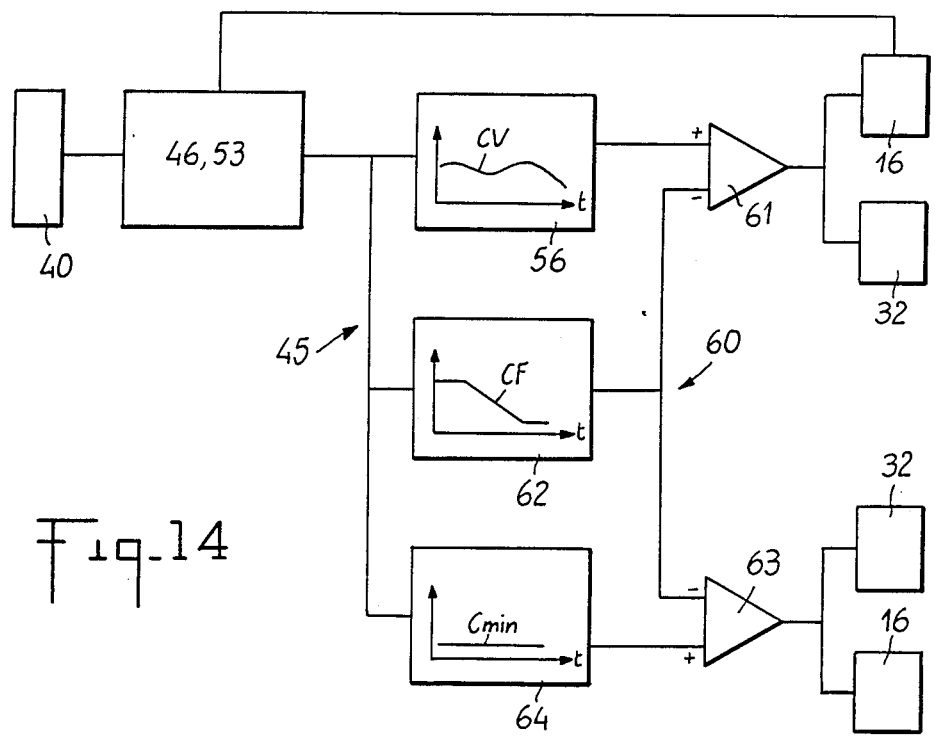
FIG. 14 is a block diagram illustrating the automatic working phases of the object of the invention.

In order to perform the aforesaid functions, the circuit 45 may, as illustrted in FIG. 14, include a two-stage comparator 60 comprising a first stage 61 receiving in input analog signal CV representing the speed curve and supplied by tacho-generator 56. Said stage 61 also receives analog signal CF representing the braking curve CF supplied by an electronic computing module belonging the circuit 45. The role of thecomparing stage is, first to stop the supply to the motor 16, and second, to energize the brake 32.

Comparator 60 comprises a second stage 63 receiving, first the signal CF supplied by module 62, and then a signal $C_{min}$ supplied by a module 64 and corresponding to a low speed control set value. The output of comparator 63 is connected to the supply of electric motor 16 in order to control said supply inat low speed and to the coil of brake 32 in order de-energize it.

The servo-control circuit 45 confers to the carriage 5 individual autonomous means of controlling its travelling speed on the trackway I. Indeed, when no information is issued by the sensor 46 and/or by the finder 53, the motor 16 is supplied for high speed and draws its power from the source 40. The carriage is then driven at maximum speed on the trackway I between two successive work stations, such as from $P_1$ to $P_2$.

When, for example, the telemetric detection cell 53 detects the presence of an obstacle on the trackway I, such as for example the presence of the preceding carriage, the circuit 51 works out the most adequate moment to trigger the slowing down phase, in order to bring the carriage to the minimum travelling speed near to the obstacle. The role of circuit 45 is therefore to determine the optimal moment for triggering the slowing down phase so as to retain a maximum travelling speed over the longest possible path length, this in order to reduce to a minimum the times when the carriage must travel at reduced speed.

Once a detection signal has been issued by the finder 53, the circuit 45 generates the video signal CF of the theoretical slowing down curve which should be adopted between maximum speed $V_{max}$ and minimum speed $V_{min}$ of the carriage. Simultaneously, the control circuit 45 records analog signal CV issued by the tacho-generator 56 and representing the image of the actual travelling speed of the carriage. When this signal exceeds the value of the theoretical slowing down curve, the servo-control circuit 45 cuts off the supply to electric motor 16 and triggers off the brake 32. Both actions therefore occur with a variable delay with respect to the origin $T_O$ of the detection signal, such delay being essentially dependent on the speed acquired by the carriage at the time of emission of the obstacle detection signal.

The speed of the carriage is slowed down by the brake 32 until such time as the theoretical braking curve CF, or even a real speed detection which could have been supplied by the tacho-generator 56, generates a signal corresponding to the set signal $C_{min}$. When such coincidence occurs, the comparator 60 simultaneously restores the low speed supply to the motor 16 and de-energizes the brake 32.

The carriage then continues to travel in the same direction, at low speed, in order to be brought against the detected obstacle.

The same occurs when the sensor 46 comes up against a bar 47 materializing a singularity and, in the illustrated example, the approaching presence of a work station P, and also defining by its length the slowing down duration from $V_{max}$ to $V_{min}$.

It is worth noting that in the two aforementioned cases, a slowing down cycle takes place leading to the determination of the minimum speed $V_{min}$. If the sensor 46 and the finder 53 should stop sending out signals, whether during or after the slowing down cycle, then the circuit 45 would restore the maximum speed $V_{max}$ suply.

It is important, in both the mentioned cases of operation, to provide means for cutting off the supply to the motor 16 and to ensure a stable stop position for the carriage 5.

For the first case, which corresponds to the presence of an obstacle on the trackway I, such as the presence of another carriage, the carriage is provided with a contact switch 65 placed on the carriage general supply circuit. Said contact switch 65 is, preferably, actuated by an articulated bumper bar 66 carried by the front face 6e, between stop buffers 67 between which said bar can retract by contact. Once the contact switch 65 has been released and no information has been issued by the sensor 46 or the cell 53, the circuit 45 restores the high speed supply to the motor 16.

Figure 15:
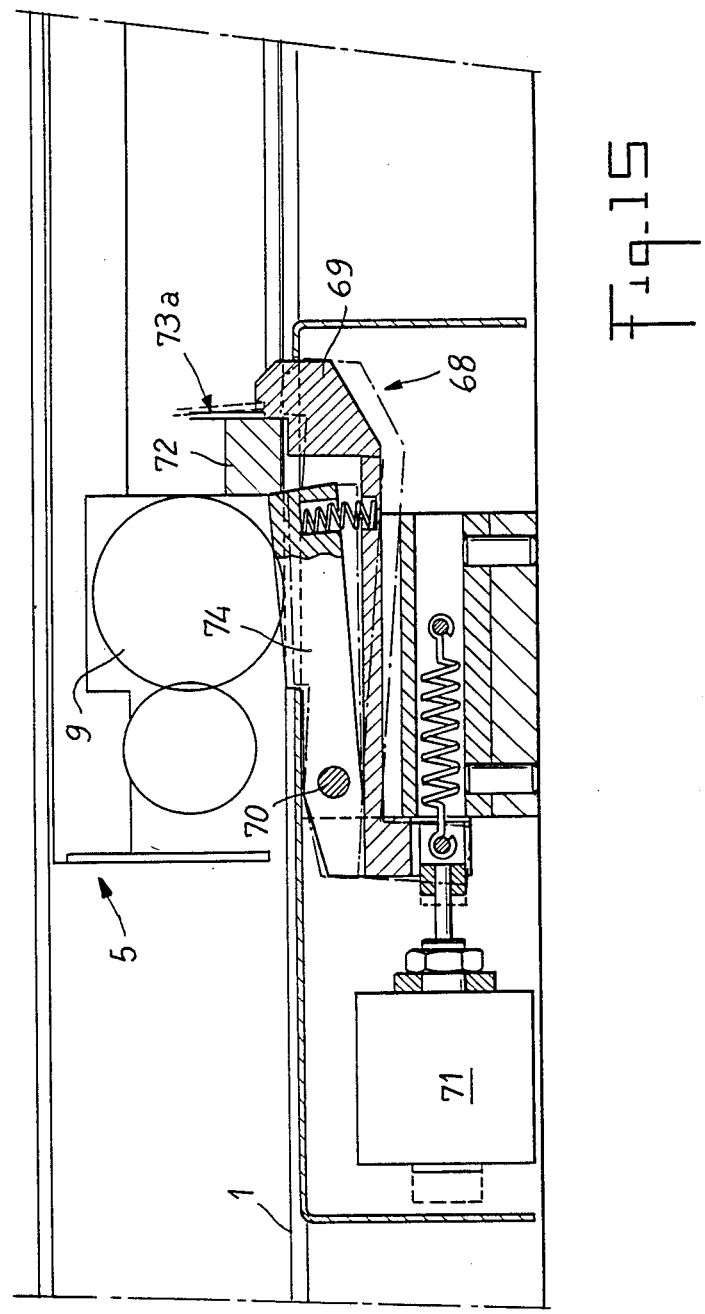
FIG. 15 is an elevational section taken along line XV—XV of FIG. 2.

For the second case, each work station P of the transfer machine (FIGS. 2 and 15) are equipped with stop means 68 consisting of a stop block 69 mounted via a spindle 70 on the structure II. The stop block 69 is permanently projecting with respect to the plane of the surfaces 1 but it can be retracted by a control member 74 such as an electro-magnet. The stop block 69 is provided in order to constitute an abutment with respect to the structure of the carriage and, in particular, to a crosspiece 72 joining the stiffening members 37. The crosspiece 72 carries a contactor 73, operationally coupled to a lever 73a designed to be actuated by the limit stop 69. Said contactor 73 is placed on the carriage general supply circuit in series with the switch 65. Preferably, the stop block 69 is operationally coupled to a ramp 74 which is elastically retractable in the progressing direction and which forms a counter-stop designed to rest behind the crosspiece 72 for immobilizing the carriage.

The supply of the electromagnet is dependent on the performance of the working cycle of the work station. The end of said cycle controls the retraction of the stop blockp which releases the contactor 73 which in turn restores the high speed supply to the motor 16 when no information is sent by the sensor 46 or by the cell 53.

FIG. 4 shows that the general supply circuit can also comprise a general switch 75 mounted in series with the contact switch 65 and with the contactor 73.

As indicated in the foregoing, the transfer machine comprises a trackway I equipped with motor-driven independent carriages which are provided with travelling environment detection means and with travelling speed servo-control means.

It is then possible to produce a transfer machine comprising a trackway I with a structural limited to the definition of rolling surfaces 1 and of lateral guiding surfaces 2. Such a trackway can then be a simple construction, with reasonable overall dimensions, in particular thickness-wise, yet offering great adaptability and mounting possibilities, due to the absence of intermediate or related driving or transfer members, as is the case with the conventional machines with free carriages.

And, it is likewise possible to produce a transfer machine with an output which is exactly adapted to the operations to be performed at the work stations, and with an automatic adaptability to a possibly varying operation process. Indeed, in all cases, each carriage can adapt its own travelling speed in optimum manner, between leaving the first work station and, either reaching an obstacle or reaching the next work station.

Consequently, a transfer machine produced in application of the invention comprises, a trackway I of the type described hereinabove, means 47 for the remote signalling of the different stations P, stopping means 68 related to each station P as well as electrical recharging means and motor-driven autonomous carriages of which the source of power is recharged by the cooperation between the blocks 41 and the read contacts 42. In this way, an adequate reserve of power is always available on-board to ensure the travelling autonomy of the carriage, even at maximum speed, between two successive work stations.

In addition to the advantage procured by a simple construction of the trackway I and by the versatility resulting from the self-adaptability of the carriages travelling speed, it is worth noting that, due to the way in which the machine works, it is possible for the sequences of operations performed at each work station, to progress with accuracy and reproducibility. Indeed, each carriage is effectively immobilized in a stable non-supplied condition, which, on the one hand, saves the power stored on-board, and on the other hand, does away any driving or frictional stresses, as is generally the case with the conventional machines. In this way, the stop block 69 undergoes no stresses which could damage it, whether it has stopped one carriage at one station or several carriages which have arrived upstream and are packed horizontally together against the carriage being attended to. Indeed, in such a case, all the packed carriages are de-energized by controlling the contact switches 65 via the bumper bars 66.

Figure 8:
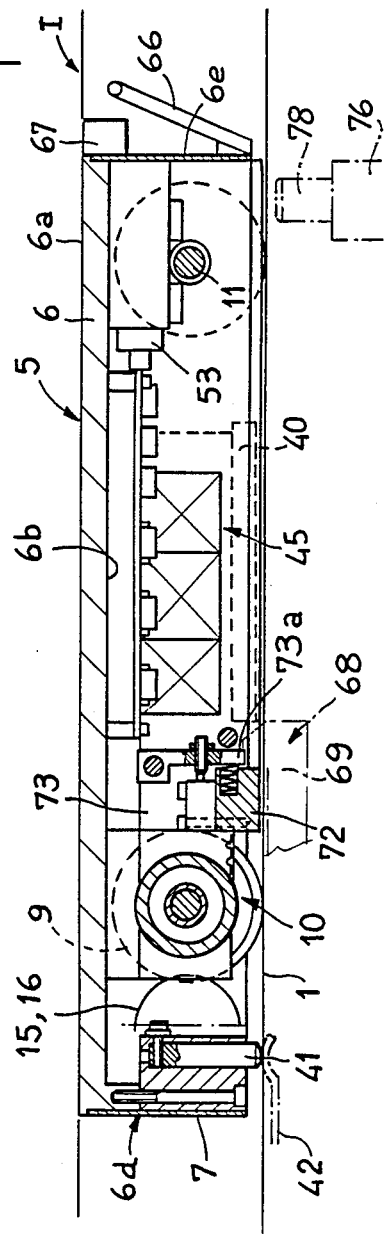

In order to enable a carriage to stop with greater exactness in front of a work station, the transfer machine may also be equipped, in front of each work station P, as diagrammatically illustrated in dot-and-dash lines in FIG. 8, with indexing means 76 provided for immobilizing each carriage exactly with respect to the operating members of each work station. The means 76 may comprise a driving member 77 such as a jack, controlling the extension of a pin 78 designed to penetrate into a housing 79 provided in at least one of the stiffening members 37.

It would also be possible to build a transfer machine comprising a trackway I without the bars 47, and carriages driven at only one low travelling speed and without a brake. In such a case, the travelling control would no longer be dependent on a circuit 45, but would be achieved, for all or nothing, by the contact switch 65 and by the contactor 73. An intermediate version could also consist in adding in the sensor 46 capable of cooperating with the bars 47.

In the above-referred embodiments, the motorized carriages could be equipped with a free wheel 80 acting as an interposed anti-backing means, as illustrated in FIG. 4, between the shaft 12 and a bearing 14.

Figure 16:
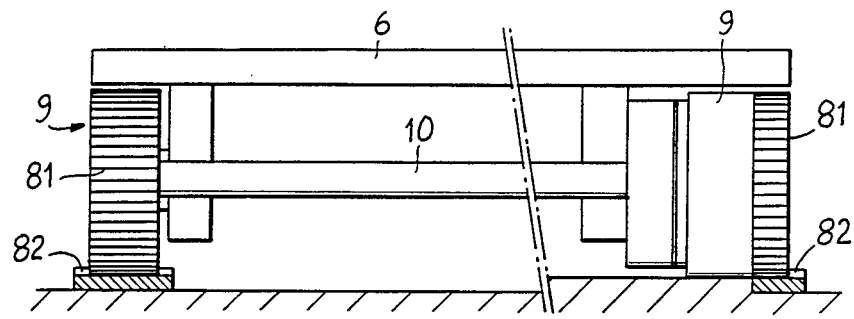
FIG. 16 is a diagrammatical cross-section showing variants of embodiment of certain members.

The fact of using a motorized carriage gives the added possibility of producing transfer machines with trackways able to have a positive or negative gradient. It is indeed possible, as illustrated in FIG. 16, for the wheels 9 to be covered with teeths 81, either entirely, as shown on the left of the figure, or only partly, as on the right of the figure. Each tooth 81 can cooperate with a tooth rack 82 formed on the surfaces 1 or mounted thereon. The combination of the teeth 81 and of the tooth rack 82 also procures to the carriages the best characteristics of acceleration and deceleration.

Figure 18:
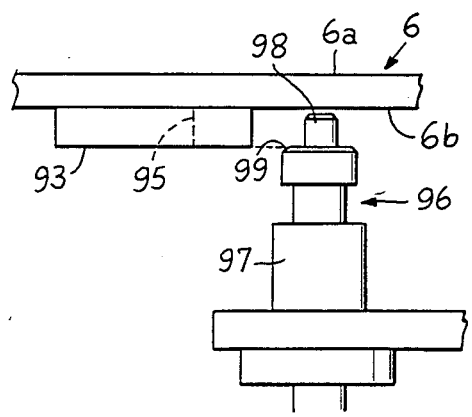
FIG. 18 is a partial elevational view of one member of the machine according to the embodiment shown in FIG. 17.

FIGS. 17 and 18 show another embodiment according to which the carriage is designed so as to comprise a motorized rear train 10 and a front train 90 constituted by two wheels 91 mounted idle on pins 92 extending vertically, from the face 6b of the plate 6.

In such a case, the carriage is also provided, on its lower face 6b and close to the longitudinal edges, with bumping blocks 93 each one presenting, in the direction of the front face 6e, a V-block 94, of which the base 95, of semi-circular shape, has a center situated on the geometrical axis of the shaft 12 of the motorized rear train 10.

Each bumping block 93 is designed to cooperate with a pivoting finger 96 carried by the trackway I and aligned with the path followed by the block. Finger 96, which is actuated by a jack 97, comprises a cylindrical stud 98 adapted to be engaged in the V-block 94 in order to nest in the base 95 when the carriages is moving at low speed. The stud 98 rises from a truncated bearing surface 99 situated, when the finger 96 is in extended position, at a level higher than that of the lower face of the bumping block 93.

As clearly shown in FIGS. 19 and 20, the low speed progression of the carriage, when a finger 96 is in extended position, causes the corresponding V-block 94 to fit over the stud 98, whereas, simultaneously, the lower face of the bumping block 93 climbs over the truncated surface 99. The carriage is thus raised laterally, of a small amount but sufficient for the corresponding wheel 9 of the motorized rear train 10, to be raised up with respect to the travelling plane of surface 1, whereas the second wheel 9 of the same train, still rests on the corresponding surface 1. Then, as a result, a pivoting moment is generated by the driving action of the outer wheel 9 to the pivoting finger 96 which constitutes a pivoting center for the whole carriage under the action of said outer wheel 9. The carriage can pivot freely due to the presence of the idle wheels 91 constituting the front train, insofar as the trackway I offers them a continuous support and travelling plane. Thus, by providing, as illustrated in FIG. 21, downstream of a finger 96, a pivoting area 100, it becomes possible to obtain a transfer machine with a trackway comprising rectilinear travel segments $S_1$ and pivoting segments $S_2$ covering an angular value range of a few degrees and 180°. Indeed, as long as the pivoting finger 96 is in projecting position, a carriage bumping into it via one of its blocks 93 pivots about the stud at low speed under the action of the outer driving wheel, while being supported by the plane surface of the pivoting area 100. When the finger 96 is retracted in, the two wheels 9 of the motorized rear train are returned in contact with the travelling plane and propel the carriage along a rectilinear path in a new direction. The retraction of finger 96 can, for example, be controlled by a proximity sensor 101 placed on the carriage pivoting path.

FIG. 21 shows that, by successive pivoting movements, it becomes possible to produce a transfer machine which comprises, at intervals or in selected and optionally varying spots, junctions, parallel by-pass tracks or any other travelling conformation heretofore unknown in the conventional machines. The implantation of pivoting areas 100 can also be instantly and readilyachieved as there are no driving members having to take into account the displacement of the carriages.

Preferably, each pivoting area is associated, upstream, to a bar 47 detected by the sensor 46 in order to trigger, via circuit 45, the slowing down speed recommended for the approach of the stud 96. The travelling speed is maintained to a reduced value during the pivoting phase by a signal transmitted to the servo-control circuit by a presence sensor 102 incorporated to the stop blocks. When the stud is retracted at end of pivoting, the bumping signal disappears and the circuit 45 restores the maximum speed supply to motor 16.

FIG. 21 also shows that the simple design of the trackway I gives the possibility of providing a switching module 103, comprising for example, an intermediate rectilinear segment $s_1$ which can be placed by an actuator 104 either in alignment in a segment $S_1$ which it contributes to defining, or opposite a by-pass track $I_a$. Such a module itself comprises a stop block, and the segment $S_1$ to which it is associated is then also provided, upstream, with the same stop block. Different switching combinations may be considered, using, in each case, only one guiding and carrying structure and only one two-way actuator.

The operation of a switching or deviation means such as a stud 96 or a module 103 can be controlled by a passage counter, a code reader placed on the track and detecting the carriages or the loads that they transport.

A trackway in a machine according to the invention can also comprise a segment pivoting about a horizontal axis, whenever a way has to be temporarily opened through the track.

What is claimed is:

1. Free transfer machine of the type comprising a trackway (I) set up in relation with work stations (P) and independent travelling carriages (5) which are carried, guided and driven along the trackway and which are adapted to the transfer the loads which they support, from one work station to another, each carriage being equipped with a train of driving wheels actuated by an on-board electric drive member energized from an on-board battery, transfer machine wherein:
    each carriage comprises:
        a variable speed motor (15),
        a rechargeable battery connected to contact blocks (41), and an individual travelling control system comprising a motor supply and control circuit (45) which is controlled by a contact switch (65) actuated by a front bumper bar (66) mounted for pivoting on a front face of each carriage and retractable between buffers (67), said bar actuating the contact switch and by a contactor (73) mounted in series with the contact switch and carried by the lower face of the carriage in such a way as to be actuated by retractable stop members, (6a) provided at each work station to actuate the contactor (73) so as to cut off the power supply to the motor when either the contact switch (65) or the contactor (73) is actuated to prevent the carriage from hitting another carriage and to accurately position the carriage at a work station, said circuit being furthermore placed under the control of environment sensors (46,53), the trackway (I) having a generally upwardly opening, "U" shaped cross-section comprising a pair of generally parallel rails ($R_1$, $R_2$) defining generally horizontal running surfaces and lateral guiding surfaces, the distance between the lateral guiding surfaces being greater than a lateral dimension of the carriage, and reed-contacts (42) located at each work station connected to an electric charge device and adapted to cooperate with the contact blocks (41) to re-charge the on-board battery when the carriage stops at the work station.

2. Transfer machine as claimed in claim 1, wherein the environment sensors comprise an inductive sensor (46) carried by each carriage and metallic bars (47) adapted via supports (46) on the trackway upstream of singularities present on said trackway.

3. Transfer machine as claimed in claims 1 wherein the environment sources further comprise, a telemetric presence finder (53) situated on the front face (6e) of each carriage and connected in parallel with said inductive sensor (46).

4. Transfer machine as claimed in claim 1 wherein said machine comprises carriages (5) equipped with an electromagnetic brake (32) associated with the train of driving wheels (10) and supplied by the control circuit (45).

5. Transfer machine as claimed in claim 4, wherein the electromagnetic brake comprises, on the one hand, an annular magnetic coil (33), connected electrically to the control circuit, which surrounds a driving shaft proximate to a wheel (9) and presenting in facing relationship to a lateral face of said wheel an annular friction disk (34) and, on the other hand, on a lateral face of said wheel, an annular disk of magnetic material mounted via elasticaly deformable strips, said disk being immobilized angularly on said wheel but being movable laterally with respect to the latter under the magnetic action of a coil.

* * * * *